(12) United States Patent
Wiklund et al.

(10) Patent No.: US 6,601,966 B1
(45) Date of Patent: Aug. 5, 2003

(54) SIGHT FOR WEAPONS

(75) Inventors: Ralf Wiklund, Ödåkra (SE); Joachim Sieg, Pfaffenhofen (DE)

(73) Assignee: GS Development AB, Malmo (SE)

( * ) Notice: Subject to any disclaimer, the term of this patent is extended or adjusted under 35 U.S.C. 154(b) by 0 days.

(21) Appl. No.: 09/529,147

(22) PCT Filed: Oct. 8, 1998

(86) PCT No.: PCT/SE98/01814

§ 371 (c)(1),
(2), (4) Date: Jun. 21, 2000

(87) PCT Pub. No.: WO99/19665

PCT Pub. Date: Apr. 22, 1999

(30) Foreign Application Priority Data

Oct. 9, 1997  (SE) ............................................... 9703683

(51) Int. Cl.$^7$ .................................................. F41G 1/34
(52) U.S. Cl. ......................... 362/110; 362/800; 42/103; 313/498
(58) Field of Search ................................ 362/110, 112, 362/800; 42/111, 103; 313/498, 499, 500

(56) References Cited

U.S. PATENT DOCUMENTS

| 3,886,396 | A | * | 5/1975 | Hammer et al. ............. 313/486 |
| 4,967,330 | A | | 10/1990 | Bell et al. .................... 362/311 |
| 5,068,969 | A | * | 12/1991 | Sibert ........................... 33/241 |
| 5,119,174 | A | * | 6/1992 | Chen ........................... 257/98 |
| 5,375,043 | A | * | 12/1994 | Tokunagna ................... 362/31 |
| 5,463,502 | A | | 10/1995 | Savage ........................ 359/819 |
| 5,638,153 | A | | 6/1997 | Zahn et al. ................... 355/35 |
| 5,642,149 | A | | 6/1997 | Palum ......................... 347/241 |

FOREIGN PATENT DOCUMENTS

EP     0545527    6/1993    ............. F41G/1/32

* cited by examiner

Primary Examiner—Sandra O'Shea
Assistant Examiner—John Anthony Ward
(74) Attorney, Agent, or Firm—James Ray & Associates

(57) ABSTRACT

In a light emitting diode device, providing a light beam with limited dispersion and primarily to be used in a so called red dot sight for a weapon, a light-impermeable mask (14) with a hole (14') for light is arranged directly on a light emitting surface of the light emitting diode element (13) in the device.

18 Claims, 2 Drawing Sheets

SIGHT FOR WEAPONS

FIELD OF THE INVENTION

The present invention relates to a light emitting device, preferably a light emitting diode device, providing a light beam with limited dispersion. The device is particularly, but not exclusively, intended for use in a so called red dot sight mounted on a weapon. The red dot is projected on a lens as an aiming point, the gunner looking through the lens when aiming.

TECHNICAL BACKGROUND

In present red dot sights it is customary to use a battery powered light emitting diode (LED) as the light source. The LED shall provide a narrow and distinct beam of light, which—as appears from the name of the device—may be red. The shape of the beam may vary but is most often circular, so that a red dot appears for the gunner in the sight. With the use of a conventional LED the beam is created by placing a mask with a narrow hole at the end of the plastic bulb of the LED. The normally desired circular beam is created by a circular hole.

Due to the presence of the bulb the mask will be at a certain distance from the light emitting surface of the LED, for example 2 mm or more. As the light dispersion increases with the square of the distance, the efficiency of the device is not satisfactory, which in turn means that the battery power will be consumed comparatively quickly.

Another problem in the conventional sight is that the intensity of the projected light varies when looking at different areas of the surface of the lens.

THE INVENTION

The main object of the invention is to remove the above stated drawbacks and to attain a light emitting device which is more efficient in providing a light beam with limited dispersion and which allows that the light emitting surface of the LED always covers the whole pattern of the mask.

According to the invention this is accomplished in that a light-impermeable mask with a hole for light is arranged on or in direct vicinity to a light emitting surface of a light emitting element in the device.

In a red dot sight use is made of a reflecting and focusing lens. With the above arrangement the light emitting surface is directly visible from every point of the lens.

With the same light intensity as provided by a conventional device the diode current may be decreased by a factor of 5–10, resulting in a corresponding increase of the battery life.

BRIEF DESCRIPTION OF THE DRAWINGS

The invention will be described in further detail below reference being made to the accompanying drawings, in which.

DETAILED DESCRIPTION OF A PREFERRED EMBODIMENT

Figure 1:
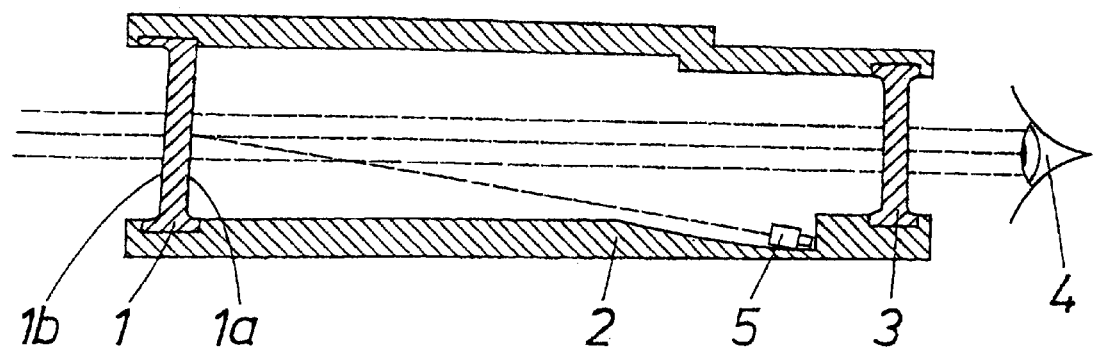
FIG. 1 is a schematic longitudinal section through a sight with a light emitting device.

The sight shown in FIG. 1 serves only the purpose of exemplifying a use of the light emitting device according to the invention.

This sight has an optical element 1, such as a lens, which is attached to the forward end of a light channel shaped as a tube 2. This tube has a circular cross section. The diameter of the optical element may be for example 35 mm. At the other end of the light channel a transparent window 3 is attached, which is directed towards the eye 4 of the gunner using a weapon (not shown) on which the sight is mounted.

The optical element 1 comprises a lens having a concave side directed towards the transparent window 3, and a convex opposite side. The concave side is spherically or parabolically shaped. The focal point of the optical element 1 falls inside the light channel below its center line. In the focal point there is provided a light emitting device, preferably a light emitting diode (LED) 5, combined with a mask to produce an aiming point in the form of a dot, a cross, a ring or the like.

The inner surface of the element 1 is coated with a partially reflecting layer 1a, which is reflective to light in a certain defined wave length interval, for example around the wave length 630 nm, i e red light only, while light of all other wave lengths passes through the element substantially without reflection, said wave length being chosen in dependence of the wave length of the light emitted from the LED 5.

The convex side of the element 1 is coated with an anti-reflecting layer 1b, a so called AR-coating, in order to avoid reflections from this side of the optical element and especially from the LED 5. If the optical element 1 consists of more than one lens the coating could preferable be on the convex side of the inner lens.

With this design the gunner's eye 4 will see a red aiming point superimposed on the image of the surroundings or the target when looking through the sight. Provided that the sight is properly mounted on the weapon, the gunner only has to place the red aiming point on the target to be able to hit it when firing the weapon.

Figure 2:
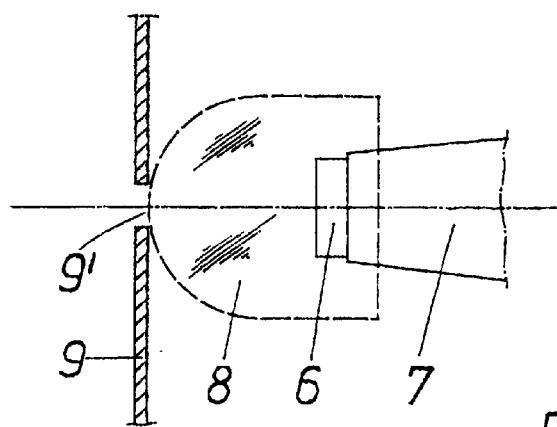
FIG. 2 is a side view of a prior art light emitting device.

A conventional LED is rather schematically illustrated in FIG. 2. A light emitting element 6 is arranged on a base 7. A plastic casing 8 is mounted on the base 7 over the element 6 and may have the shown shape in order to properly direct the light from the element 6. A mask 9 with an opening 9' is placed over the end of the casing 8 in order to define the shape of the aiming point and mask off undesired light. Normally, the opening 9' is circular (for obtaining an aiming point in the form af a dot) and may for example have a diameter of 0.06 mm. In this conventional LED the distance between the light emitting surface of the element 6 and the mask 9 may be of the order of 2 mm. Taking into account that the light dispersion is proportional to the square of this distance, it is obvious that the efficiency is not satisfactory.

Figure 4:
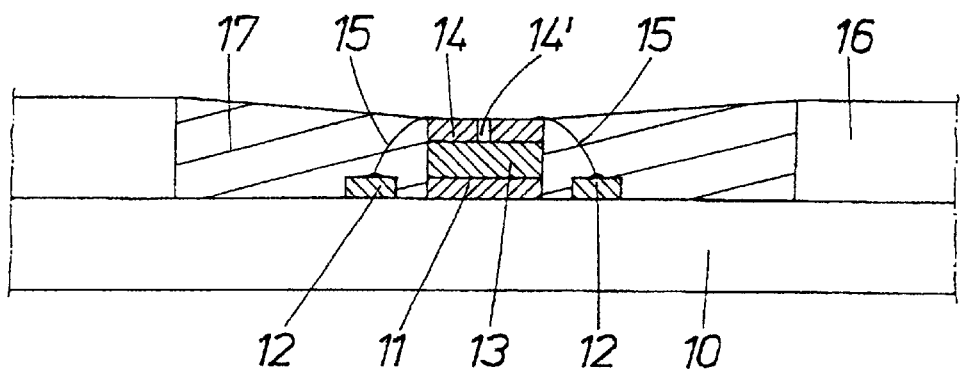
FIG. 4 is a section along the line IV—IV in FIG. 3.
Figure 3:
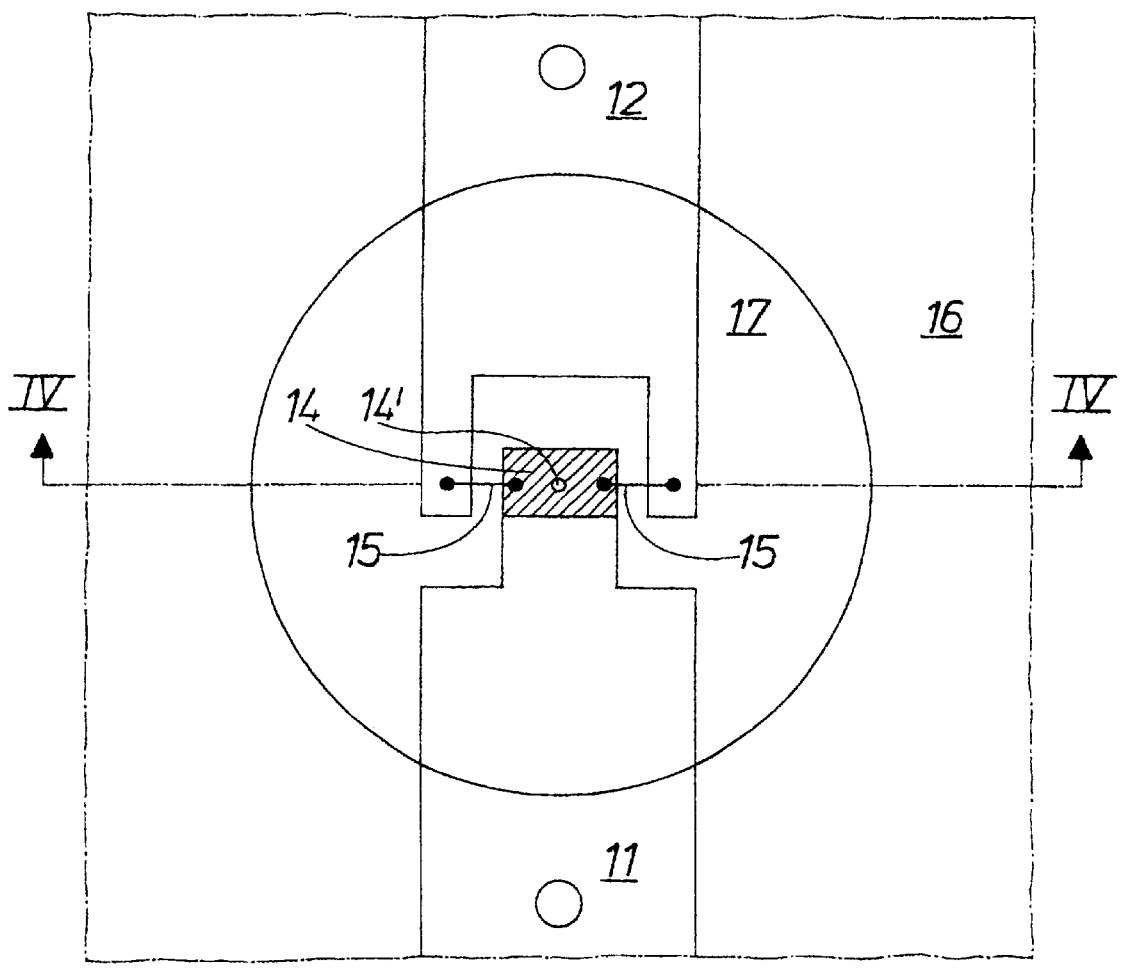
FIG. 3 is a top view of a light emitting device according to the invention.

A light emitting device according to the invention has the following design, reference being made to FIGS. 3 and 4. On an electrically non-conducting base plate 10 there are arranged an electrode 11 and a second electrode 12 of for example gold or aluminium or any other suitable metal. They may be shaped as shown in FIG. 3 to be suitably close to each other.

A light emitting diode element 13 with planar surfaces is arranged at the end of the anode 11. The material used for the element 13 is conventional per se. It may for example be GaAlAs for obtaining light emission in the red part of the spectrum (620–690 nm), GaP for the green part (540–570 nm) or SiC for the blue part (440–480 nm). It is preferred that the element 13 has a light intensity of at least 10 mcd at a current of 20 mA.

A mask 14 with a hole 14', which for example may be circular for obtaining a circular light beam, is arranged directly on top of the diode element 13. This mask 14 may be made for example of gold or another metal and have a thickness of the order of 1 to 5 μm. It may be vaporized or sputtered directly on the element 13. Alternatively, it may be glued or painted thereto. As in the prior art device described with reference to FIG. 2, the hole 14' may have a diameter of 0.06 mm.

Bonding threads 15 of gold, aluminium or any other suitable material are arranged to connect the cathode 12 with the upper side of the mask 14. These threads may have a diameter of the order of 5 $\mu$m. The bonding itself will be described below with reference to FIG. 5.

The described light emitting device 10–15 may be arranged in an opening in a top plate 16 connected to or integral with the base plate 10. The material in the plates 10, 16 may be glass fiber reinforced epoxy or ceramic. As a late step in the creation of the device, the opening in the top plate 16 is filled with an opaque mass 17 of black ink protecting the device against leakage of unwanted light and mechanical stress but leaving the hole 14' in the mask 14 unobstructed, so that a light beam can be emitted therethrough when the device is operated.

Figure 5:
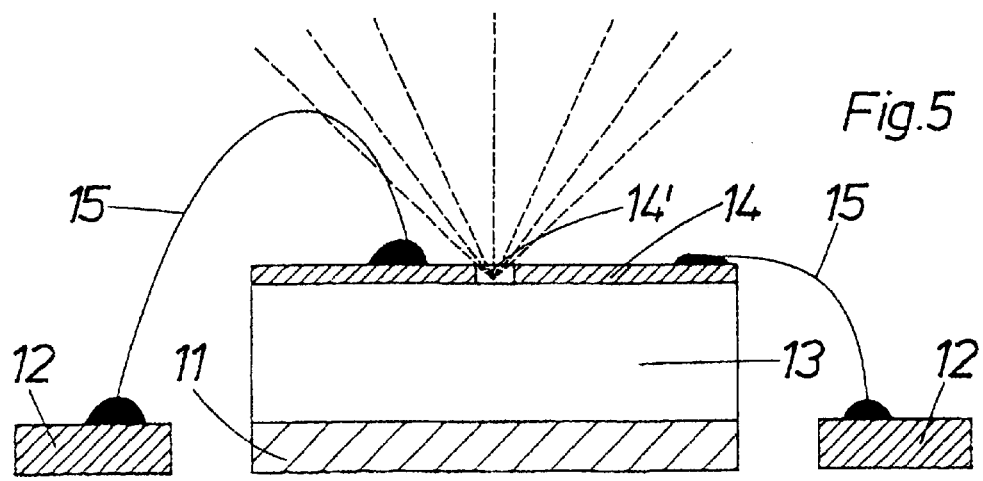
FIG. 5 is a section through a light emitting device according to the invention and serves to illustrate a special feature of the invention.

The light emitting device is shown to a larger scale in FIG. 5, which serves to illustrate a conventional bonding method to the left and a new and improved method to the right.

In the conventional case the bonding thread 15 is connected substantially perpendicularly to both the electrode 12 and the mask 14, so that the bow-shaped thread may obstruct the light beam leaving the hole 14', as is illustrated to the left in FIG. 5.

For obviating this problem and to obtain a design where the bonding thread is less vulnerable to mechanical stress and may be entirely protected by the mass 17, the bonding thread 15 may be bonded substantially parallel with the surface of the mask 14 by means of a so called wedge bonding, as is illustrated to the right in FIG. 5.

An important purpose of placing the mask with its hole as close as ever possible to the light emitting element is to utilize the light before its spherical dispersion has become too large. In the conventional device according to FIG. 2 the distance from the light emitting surface to the mask was said to be of the order of 2 mm, whereas in the inventive device of FIGS. 3 and 4 it may be less than 0.05 mm. For a given current the light intensity will be greatly improved. Differently speaking, it will be possible to reduce the current for obtaining a certain light intensity. The reduction factor may practically be of the order of 5–10 resulting in a prolongation of the battery life of the same order. This is of special importance in military applications.

What is claimed is:

1. A light emitting device for providing a light beam with limited dispersion, said light emitting device comprising;
   (a) a light emitting element including a light emitting diode element;
   (b) a light impermeable mask deposited directly onto a surface of said light emitting diode element by at least one of a vaporization and sputtering thereby preventing loss of light by dispersion before it reaches and leaves the mask; and
   (c) an aperture formed through said light impermeable mask.

2. The light emitting device according to claim 1, wherein the light beam is projected towards a lens, characterized in that the light emitting surface of the light emitting element covers the whole pattern of the mask as viewed from all angles defined by the lens.

3. The light emitting device according to claim 1, wherein said light emitting element comprises a light emitting diode element having a planar light emitting surface on which said mask is arranged.

4. The light emitting device according to claim 3, characterized in that the diode element is of GaAlAs for light emission in the red part of the spectrum (620–690 nm), GaP for green part (540–570 nm) or SiC for the blue part (440–480 nm).

5. The light emitting device according to claim 3, characterized in that the mask is vaporized or sputtered on the diode element.

6. The flight emitting device according to claim 3, characterized in that the mask is glued or painted on the diode element.

7. The light emitting device according to claim 3 wherein said light emitting diode element includes an electrode and said electrode, said light emitting diode element and said mask, which is formed from an electrically conducting material, are arranged on top of each other as a unit, said unit being positioned on a base plate adjacent to a pair of electrodes and wherein bonding threads extend from said pair of electrodes to the free surface of said mask.

8. The light emitting device according to claim 7 wherein said unit comprising said electrode, said light emitting diode element and said mask, is embedded in a protective opaque mass and wherein said aperture in said mask is unobstructed by said mass to enable light emission there through.

9. The light emitting device according to claim 7, characterized in that the bonding threads are bonded substantially parallel to the free surface of the mask.

10. The light emitting device according to any of the preceding claims, characterized by its use in a sight for a weapon or similar equipment.

11. The light emitting device according to claim 2, wherein said light emitting element comprises a light emitting diode element having a planar light emitting surface on which said mask is arranged.

12. The light emitting device according to claim 11, characterized in that the diode element is of GaAlAs for light emission in the red part of the spectrum (620–690 nm), GaP for green part (540–570 nm) or SiC for the blue part (440–480 nm).

13. The flight emitting device according to claim 11, characterized in that the mask is vaporized or sputtered on the diode element.

14. The light emitting device according to claim 11, characterized in that the mask is glued or painted on the diode element.

15. The light emitting device according to claim 11 wherein said light emitting diode element includes an electrode and said electrode, said light emitting diode element and said mask, which is formed from an electrically conducting material, are arranged on top of each other as a unit, said unit being positioned on a base plate adjacent to a pair of electrodes and wherein bonding threads extend from said pair of electrodes to the free surface of said mask.

16. The light emitting device according to claim 15 wherein said unit comprising said electrode, said light emitting diode element and said mask, is embedded in a protective opaque mass and wherein said aperture in said mask is unobstructed by said mass to enable light emission there through.

17. The light emitting device according to claim 15, characterized in that the bonding threads are bonded substantially parallel to the free surface of the mask.

18. The light emitting device according to claims 11, 12, 13, 14, 15, 16 or 17, characterized by its use in a sight for a weapon or similar equipment.

* * * * *